United States Patent [19]

Paavonen

[11] Patent Number: 5,799,251
[45] Date of Patent: Aug. 25, 1998

[54] RADIO SYSTEM HAVING ADDITIONAL SIGNALLING CHANNEL DEDICATED FOR USER DATA TRANSMISSION OTHERWISE CARRIED ON CONTROL CHANNEL

[75] Inventor: Tapio Paavonen, Saarijärvi, Finland

[73] Assignee: Nokia Telecommunications Oy, Espoo, Finland

[21] Appl. No.: 691,442

[22] Filed: Aug. 2, 1996

Related U.S. Application Data

[63] Continuation-in-part of Ser. No. 211,900, filed as PCT/FI93/00324, Aug. 17, 1993, published as WO94/05125, Mar. 3, 1994, abandoned.

[30] Foreign Application Priority Data

Aug. 18, 1992 [FI] Finland ............... 923708

[51] Int. Cl.⁶ .................................. H04B 7/00
[52] U.S. Cl. ............................ 455/517; 455/511
[58] Field of Search .................. 455/34.1, 34.2, 455/54.1, 54.2, 56.1, 33.1, 517, 511, 509, 450

[56] References Cited

U.S. PATENT DOCUMENTS

| | | | |
|---|---|---|---|
| 4,831,373 | 5/1989 | Hess | 340/825.03 |
| 4,837,858 | 6/1989 | Ablay et al. | 455/34 |
| 4,870,408 | 9/1989 | Zdunek et al. | 455/34.1 |
| 4,903,320 | 2/1990 | Hanawa | 455/34.2 |
| 5,235,598 | 8/1993 | Sasuta | 455/34.1 |
| 5,239,678 | 8/1993 | Grube et al. | 455/34.1 |
| 5,420,574 | 5/1995 | Erickson et al. | 455/34.1 |

FOREIGN PATENT DOCUMENTS 332818  9/1989  European Pat. Off. .

OTHER PUBLICATIONS

WO.88/08648.

*Primary Examiner*—Edward F. Urban
*Attorney, Agent, or Firm*—Pillsbury Madison & Sutro LLP

[57] ABSTRACT

A radio system and a method of transmitting data in a radio system, in which each base station has a radio channel operating as a call channel for signalling between the base station and mobile radio stations. User data can be transmitted on control channels among the actual control signalling, but the data transmission may block the control channel and prevent the normal operation of the control channel. The radio system includes for the user data transmission at least one radio channel operating like a control channel, but transmitting signalling that prevents the mobile stations from selecting the radio channel as a control channel.

13 Claims, 2 Drawing Sheets

RADIO SYSTEM HAVING ADDITIONAL SIGNALLING CHANNEL DEDICATED FOR USER DATA TRANSMISSION OTHERWISE CARRIED ON CONTROL CHANNEL

This is a continuation of application Ser. No. 08/211,900, filed as PCT/FI93/00324 Aug. 17, 1993 published as WO94/05125 Mar. 3, 1994, now abandoned.

FIELD OF THE INVENTION

The invention relates to radio systems and particularly to a data transmission in radio systems.

BACKGROUND OF THE INVENTION

For radio telephone systems according to the recommendations MPT 1343 and 1327 published by the British Department of Trade and Industry (DTI) there is defined a transmission of Short Data Messages (SDM) and Extended Data Messages (EDM) on a control channel, among other control signalling. SDIL transmission can be utilized for two-way transmission of short alpha-numeric text messages or application-specific data over the network between two subscriber terminals or other devices, such as computers, etc. A single SDM may include predetermined groups of characters and a corresponding maximum number of characters. An EDM comprises four interconnected SDMs at the maximum. However, since the data communication takes place on the control channel among the normal control signalling, it is associated with the drawback that the control channel is blocked in relatively simple applications already, which causes interference in the control signalling and even endangers the speech traffic of the system. For this reason, the data transmission capacity provided in this manner remains very low. For a more efficient data transmission, a separate free-format data transmission using external modems has been defined for the radio systems according to MPT 1343 and 1327. For each modem call, a traffic channel is reserved in a normal way, whereby control signalling does not interfere the data transmission during the modem call. However, it is expensive and unnecessarily complicated for the customer to use external modems and to reserve an entire traffic channel, when the data transmission is occasional and requires relatively low capacity, but more than the standard SDM/EDM transmission is able to deliver.

SUMMARY OF THE INVENTION

The object of the present invention is to increase substantially the transmission capacity of SDM/EDM-type transmission in a radio system and to avoid additional costs due to the external modems.

According to the invention, a radio system, comprising mobile radio stations and a plurality of base stations, each base station having a radio channel operating as a call channel for signalling between the base station and mobile radio stations, the mobile radio stations being capable of transmitting user data on control channels among the actual control signalling, is characterized in that the radio system comprises for said user data transmission at least one radio channel operating like a control channel, but transmitting control signalling, which prevents the mobile stations from selecting said radio channel as a control channel.

The basic idea of the present invention is that a mobile radio station is always commanded to a pre-determined control channel (which may be referred to as a data channel) for a SDM/EDM transmission. As far as the radio system is concerned, this data channel operating like a control channel is similar to the actual control channel, but the system code transmitted in its signalling and defining the current radio system for the mobile stations is selected in such a way that none of the mobile radio stations can select this radio channel to be the control channel. A plurality of mobile stations may communicate simultaneously on such a data channel and perform data transmission in the same way as on a normal control channel. The data channel lacks, however, all such normal control signalling that is not required for SDM/EDM transmission, and therefore, the capacity of the data transmission does not need to be restricted because of the control signalling. Naturally, such a control channel reserved for data transmission can also be blocked, if there is a sufficient amount of data transmission, but even then the speech traffic, which is generally considered the most important form of traffic in the radio telephone networks, is not endangered. Moreover, several channels can be reserved for the data traffic, depending on the need of capacity.

By means of the invention, a novel mode of transmitting data is provided between a normal SDM/EDM transmission and a conventional modem call. The system differs from a radio system conforming strictly with MPT1343/1327 therein that, in connection with SDM/EDM calls, the network control shall be capable of commanding the mobile radio stations always to a predetermined dedicated data channel. Accordingly, changes are required only in the network control and small additional changes in the software of the radio telephone.

The invention relates further to a method of transmitting data in a radio system, comprising mobile radio stations and a plurality of base stations, each base station having a radio channel operating as a control channel for signalling between the base station and mobile radio stations, in which method a mobile radio station requests permission to send user data by sending a request message on the control channel to a base station, the base station grants a permission to send user data by sending an acknowledgement message on the control channel and the mobile radio station sends a user data message in response to the reception of the acknowledgement message. The method is characterized in that, after having received the request to send user data from the mobile radio station, the base station sends the mobile radio station a command to go for a data transmission to the radio channel operating like a control channel, but reserved only for said user data transmission.

The invention relates also to a method of transmitting data in a radio system, comprising mobile radio stations and a plurality of base stations, each base station having a radio channel operating as a call channel for signalling between the base station and mobile radio stations, in which method a base station sends a packet data transmission request on the control channel to a mobile station and the mobile station sends an acknowledgement message to the base station on the control channel. The method is characterized in that, after having received the acknowledgement message from the mobile radio station on the control channel, the base station sends to the mobile radio station a command to go for a data transmission to the radio channel operating like a call channel, but reserved only for data transmission.

BRIEF DESCRIPTION OF THE DRAWINGS

The invention will now be explained in more detail by means of illustrating embodiments with reference to the attached drawings, in which.

DETAILED DESCRIPTION OF THE INVENTION

Figure 1:
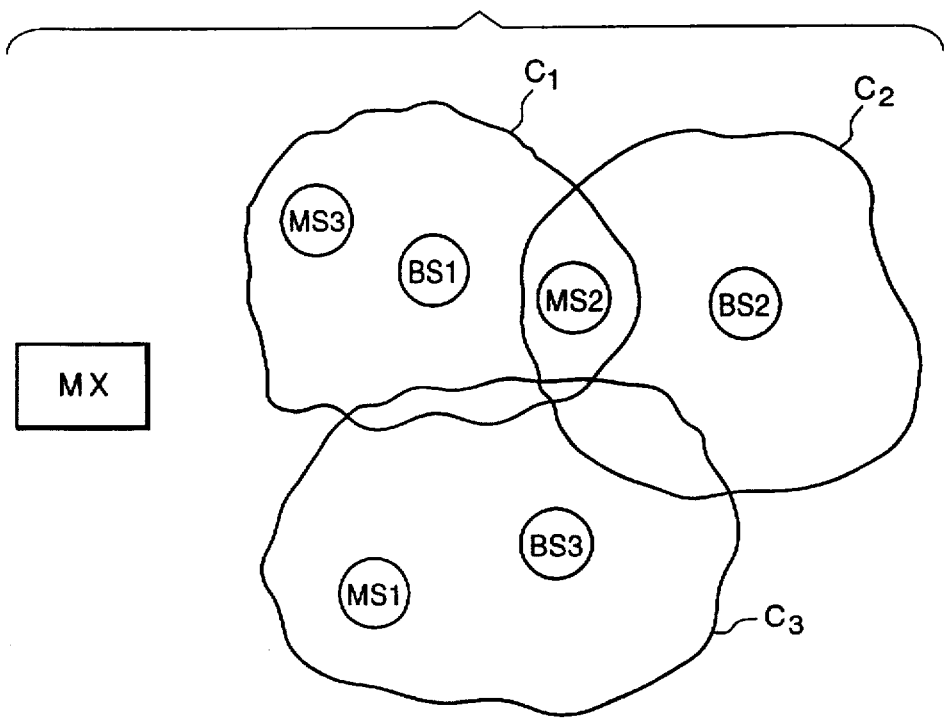
FIG. 1 illustrates one radio system, to which the invention is applied.

FIG. 1 shows a radio telephone system, in which a geographic area covered by the system is divided into smaller radio areas, viz. radio cells C1, C2 and C3, in such a way that adjacent cells have abutting or overlapping peripheral areas. Each cell C1, C2 and C3 includes at least one fixed multichannel transceiver equipment BS1, BS2 and BS3, referred to a base station herein. Base stations BS1, BS2 and BS3 are connected by fixed links, such as cables, to a mobile telephone exchange MX, which thus controls several base stations BS. For speech connections or data connections, frequency channels are allocated for the cells for radio connection with mobile subscriber stations in the cells, i.e. with radio telephones MS, in such a manner that at least cells close to each other have different frequencies simultaneously in use.

Figure 2:
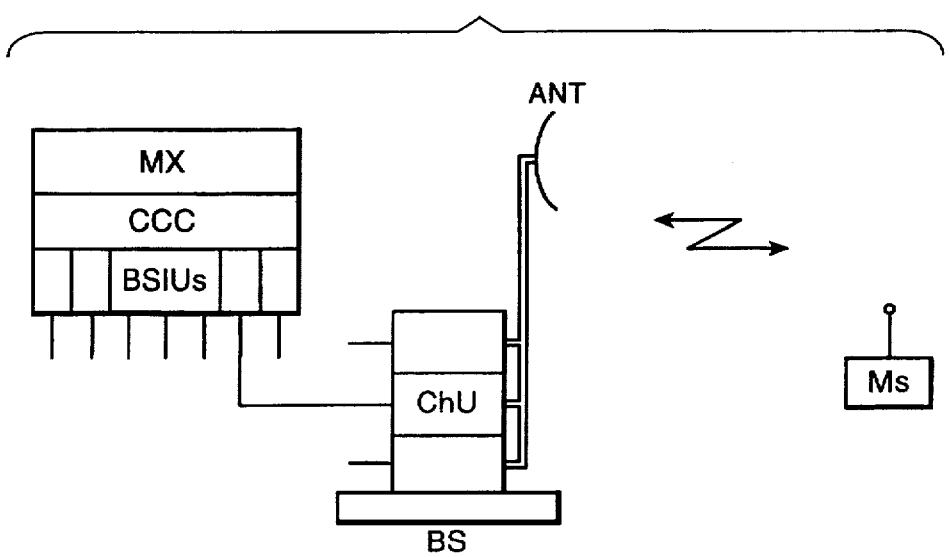
FIG. 2 illustrates a connection between a mobile telephone exchange and a base station.

FIG. 2 illustrates an example of an interconnection between the mobile telephone exchange MX and a base station BS. The mobile telephone exchange includes several Base Station Interface Units (BSIU), each of which operates as a link between a Call Control Computer (CCC) and a radio Channel Unit (ChU) of the base station. Each base station comprises several radio channel units ChU, each of which includes a radio transceiver. A channel unit ChU may operate on (at) one predetermined radio channel (frequency) or the mobile telephone exchange MX may allocate channels dynamically call by call by commanding the channel unit ChU to operate on the desired radio channel of the system.

An interface unit (BSIU) has four main tasks: to control access to the radio channel relating to the unit, to convert and transmit forward messages between radio units, i.e. channel units ChU, and the call control computer CCC, to connect the speech paths from the exchange MX to the radio channel as well as to control and monitor the operation of the base station. One BSIU controls one channel, which may be either a traffic channel or a control channel used by the system for control signalling, such as call setup signalling. The signalling on the control channel preferably conforms to MPT1327. Typical signalling comprises connection request messages sent by the base station and the radio telephone to each other and acknowledgements thereof as well as commands, sent by the base station, to go to a certain traffic channel for a call.

MPT1343, Section 14, defines transmission of short data messages on a control channel between radio telephones MS and a mobile telephone exchange MX over a base station BS. This defined data transmission makes it possible to send HEAD messages including free-format data on the control channel in both directions, i.e. from MS to MX and from MX to MS. Herein, the term "HEAD message" means both a HEAD address code word and associated data code words. The procedures defined in MPT1343, Section 14, support the solution according to which one segment of free-format data is sent. A segment is such an amount of free-format data that can be included in one HEAD message, as has been defined in MPT1327, Paragraph 3.1. However, it is possible to link up to four segments to each other.

A data transmission according to the specification MPT1343 takes places on a control channel as follows, when an MS is sending over MX to another MS. A calling radio unit MS requests a permission to send a short data message (SDM) by sending to a base station BS a Random Access Request (RQC) message on the control channel, which message is addressed to another radio unit, to a device in a fixed network or to a data service. The base station BS relays the message further to the mobile exchange MX. The mobile exchange MX checks the availability of the called radio unit (addressed to) by using a general availability check message AHY, before sending the calling radio unit MS a Short Data invitation message AHYC (defined in MPT1343, Paragraphs 5.5.3.2.1 and 5.5.3.2.8) on the same control channel over BS. The calling radio unit MS sends on the same control channel to the base station BS and further to the mobile exchange MX a HEAD message and up to four appended data code words. Then the mobile exchange MX forwards the data by retransmitting the same HEAD message to the called radio unit MS, which shall respond with an acknowledgement according to the procedures outlined in MPT1343, Section 14. MX sends the calling radio unit an acknowledgement to advise the receipt of the HEAD message by the called radio unit. If a group of radio units instead of a single radio unit is called, the radio units in the group do not acknowledge the HEAD message, in which case MX sends the calling radio unit an acknowledgement telling whether MX has received the HEAD message and sent it forward to the group.

If the calling MS sends data to a subscriber of the fixed network, the signalling concerning the called MS is naturally omitted from the above, and MX forwards the data to the subscriber of the fixed network.

If MX itself transmits data or delivers data from a subscriber of the fixed network, the signalling concerning the calling MS is naturally omitted from the above.

In the present invention, interference in signalling relating to call establishment and maintenance, and thereby interference in speech traffic due to the SDM/EDM transmission are prevented by reserving for data transmission a dedicated control channel, on which is sent no more control signalling than what is necessary for providing a data transmission. This signalling includes a so-called ALOHA message, which gives the radio units MS monitoring the control channel a permission to send the above-mentioned RQC message to a base station BS. Signalling messages sent by the system include an SYS code indentifying the system, on the basis of which code the radio units MS know that the radio channel belongs to their own system. The SYS code used on the control channel reserved for data transmission according to the invention is selected in such a way that no one of the radio units MS is able to select this radio channel as a control channel for monitoring and performing other signalling than signalling relating to SDM/EDM transmission. The use of the SYS code and the selection of the control channel are described in MPT1327, Section 9.

The invention will be illustrated in the following by using as an example a SDM/EDM transmission from an MS over the radio system to another MS.

When a calling radio unit MS desires to perform an SDM/EDM transmission, it sends on a normal control channel (which is not said data transmission channel) in a normal manner an RQC message, in which it requests permission to send data. After the radio system has made sure that the called party of the data transmission (e.g. another radio unit) is available, the system commands both parties of the data transmission by a normal GO-TO-CHANNEL message to said radio channel operating like a control channel for performing the data transmission on that data channel. Several radio units may be allocated to the same data channel simultaneously, the accurate number of the radio units depending on the amount of data transmission. The call control CCC of the mobile exchange MX preferably controls the amount of radio units on the data channel in such a way that the effective transmission rate of the data channel per a radio unit does not decrease too low, e.g. below a predetermined threshold.

Figure 3:
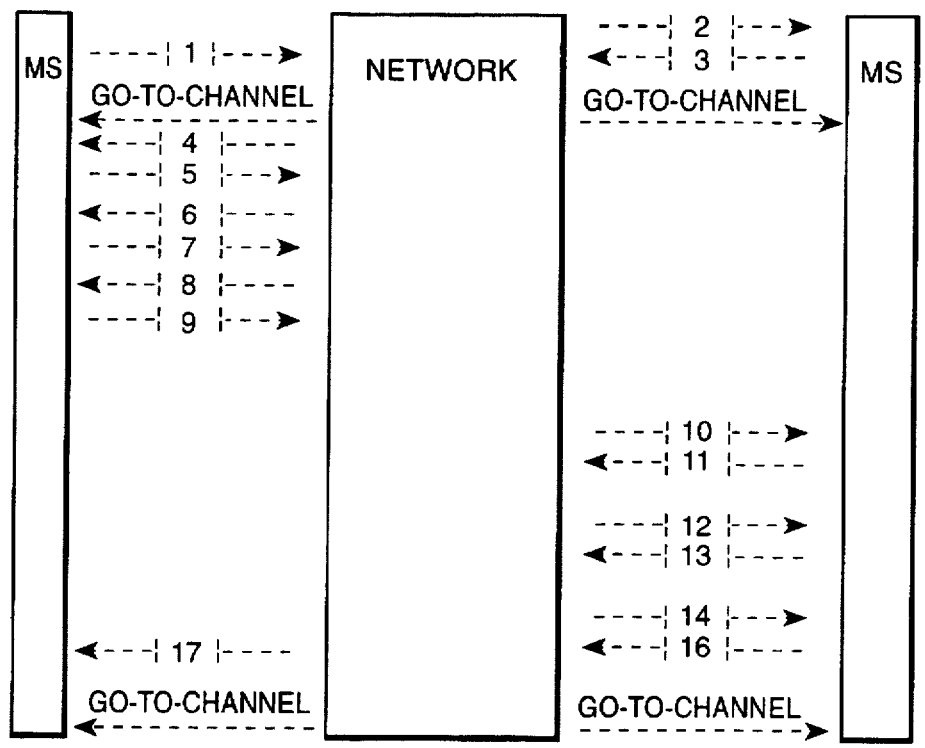
FIG. 3 and 4 are signalling diagrams of some data transmission transactions according to the invention.

FIG. 3 shows a signalling diagram illustrating an application of the present invention to a multisegment SDM/EDM transmission according to MPT1343, Section 14, between two radio units MS. At 1, a calling radio unit MS requests a SDM transmission by sending an RQC message on a normal control channel. The value of the field SLOTS of the RQC message is "11" indicating that three time slots of the channel are required for a HEAD message containing the first segment of the multisegment transmission (MST).

After having received the RQC message, at 2, the fixed network (the MXs and BSs) sends the called radio unit MS on a normal control channel an AHY message in order to check the availability of the called radio unit MS. At 3, the called MS sends on the normal control channel an ACK message to the network as an acknowledgement of the AHY message.

After this the network commands the both radio units MS for a data session to go to a radio channel reserved for data transmission and operating like a control channel by sending them on the normal control channel a GO-TO-CHANNEL command containing the number of said data transmission channel. After the radio units MS have gone to the data transmission channel, the network sends to the calling radio unit MS on the data channel an AHYC message, in which field DESC is set to state "100". The first bit of field DESC indicates that a multisegment transmission is supported. The second and third bit of the field indicate that a first data segment is requested. Field SLOTS is in state "11", which indicates that the network has reserved three time slots from the data channel for a HEAD message containing the first data segment.

At 5, the calling MS sends on the data transmission channel a HEAD message containing the first data segment. GFI field of the HEAD message indicates the data format. Field NEG="10" indicates that two more segments will be sent. Field CSEG="1" indicates that three time slots from the data transmission channel are required for a HEAD message containing the following segment.

At 6, the network sends the calling MS an AHYC message, in which field DESC is in state "101" requesting a HEAD message containing the second data segment. Field SLOTS is in state "11" indicating that three time slots have been reserved for the HEAD message. At 7, the calling MS sends a HEAD message containing the second data segment. Field NSEG="01" indicates that one or several more data segment(s) will be transmitted. Field CSEG ="0" indicates that two time slots are required for a HEAD message containing the following segment.

At 8, the network sends the calling MS an AHYC message, in which field DESC ="110" requests a HEAD message containing the third data segment. Field SLOTS is in state "10" indicating that two time slots have been reserved for the HEAD message. At 9, the calling MS sends a HEAD message containing the third segment. Field NSG will not be sent or it is in state "00" indicating that all segments have been transmitted.

At 10, the network sends the called MS a HEAD message containing the first one of said data segments on the same or another data channel. At 11, the called MS sends an ACKB message as an acknowledgement, which message indicates that the HEAD message has been received successfully.

At 12, the network sends the called MS on the data channel a HEAD message containing one of said two data segments, and the called MS acknowledges a successful reception by sending an ACK message on the data channel at 13. Then, at 14, the network sends on the data channel a HEAD message containing the last data segment to the called MS, which acknowledges the reception by sending an ACK message (at 15).

Then, at 17, the network sends the calling MS an ACK message, which indicates that the data transmission has been successfully completed (17).

After the termination of the data transmission the network sends in a GO-TO-CHANNEL message a command to MS to go back to the original control channel. It is also possible that MS is allowed to stay on the data channel operating like a call channel for a limited time after the termination of the data transmission in order to wait for a new data transmission, if the network knows that it is to be expected.

Figure 4:
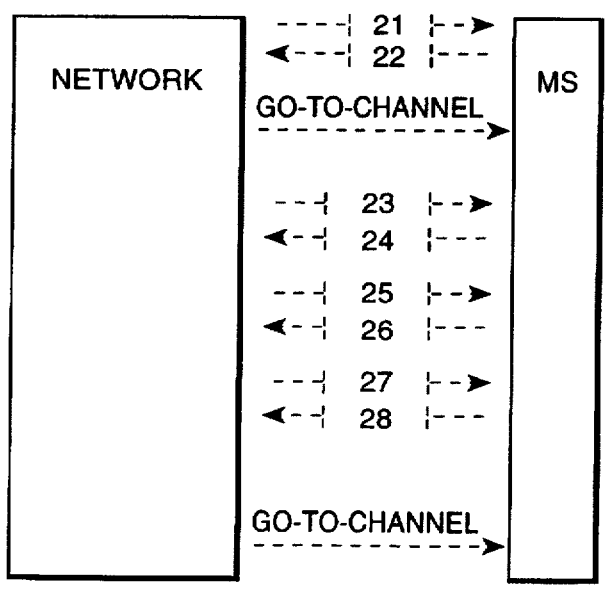

FIG. 4 shows a signalling diagram illustrating an application of the present invention to a multisegment SDM/EDM transmission according to MPT1343, Section 14, from the network to a radio telephone MS. At 21, the fixed network (the MXs and BSs) sends the radio unit MS on a normal control channel an AHY message in order to check the availability of the called radio unit MS. At 22, the called MS sends the network on the normal control channel an ACK message as an acknowledgement of the AHY message.

Subsequently, the network commands the radio unit MS to go to the radio channel reserved for data transmission and operating like a call channel, by sending a GO-TO-CHANNEL command containing the number of said channel on the normal control channel.

Then, at 23 to 28, data is transmitted from the network to a radio telephone MS by a signalling similar to the signalling at 10 to 16 in FIG. 3. After the termination of the data transmission, the network sends in a GO-TO-CHANNEL message a command to MS to go back to the original control channel.

The figures and the associated description are only intended to illustrate the present invention. As to the details, the radio system and the method according to the invention may vary within the scope of the attached claims.

I claim:

1. A radio system, comprising
   a plurality of mobile radio stations,
   a base station,
   a mobile exchange,
   a first radio channel dedicated to operating only as a control channel for signalling control messages between said base station and said mobile stations and for transmitting user data messages, said control messages transmitted on said control channel by said base station including a first system code indicating to said plurality of mobile stations that said first radio channel is a control channel,
   a second radio channel dedicated to operating only as an additional signalling channel for transmitting user data messages and control messages and operating according to the same protocol as said first radio channel, said control messages transmitted on said additional signalling channel by said base station including a second system code indicating to said plurality of mobile stations that said second radio channel is not a control channel, said first radio channel being capable of operating as a control channel while said second radio channel is transmitting user data messages.

2. A radio system, comprising a plural of mobile radio stations, a base station, a mobile exchange, a first radio channel dedicated to operating only as a control channel for signalling control messages between said base station and said mobile stations and for transmitting user data messages, said control messages transmitted on said control channel by said base station including a first system code indicating to said plurality of mobile stations that said first radio channel is a control channel, a second radio channel dedicated to operating only as an additional signalling channel for transmitting user data messages and control messages and operating according to the same protocol as said first radio channel, said control messages transmitted on said additional signalling channel by said base station including a second system code indicating to said plurality of mobile stations that said second radio channel is not a control channel, said mobile exchange being responsive to a user data transmission request transmitted by one of said plurality of mobile stations on said control channel for commanding said one of said plurality of mobile stations to said additional signalling channel for user data transmission, said mobile exchange being responsive to the end of the user data transmission on said additional signalling channel for commanding said one of said plurality of mobile radio stations to return to said control channel, said first radio channel being capable of operating as a control channel while said second radio channel is transmitting user data messages.

3. A data transmission method in a radio system, comprising steps of providing a first radio channel dedicated to and operating only as a control channel for signalling control messages between a base station and a plurality of mobile stations and for transmitting user data messages, providing a second radio channel dedicated to and operating only as an additional signalling channel for transmitting user data messages and control messages and operating according to the same protocol as said first radio channel, providing said control messages transmitted on said control channel with a first system code indicating to said plurality of mobile stations that said first radio channel is a control channel, providing said control messages transmitted on said additional signalling channel with a second system code indicating to said plurality of mobile stations that said second radio channel is not a control channel, transmitting a user data transmission request from one of said plurality of mobile radio stations on said control channel, transmitting from said base station to said one of said plurality of mobile radio stations on said control channel a command to go to said additional signalling channel, transmitting a user data transmission grant message from said base station to said one of said plurality of mobile radio stations on said additional signalling channel, carrying out a user data transmission on said additional signalling channel, while transmitting control messaging on said control channel.

4. A method according to claim 3, comprising step of checking the availability of a called party prior to said step of transmitting said command.

5. A method according to claim 3, comprising a further step of allowing two or more of said mobile radio stations to simultaneously communicate on said additional signalling channel.

6. A method according to claim 5, comprising a further step of controlling the number of said mobile radio stations which communicate simultaneously on said additional signalling channel in such a way that an effective transmission rate per a mobile radio station on said additional signalling channel is equal to or higher than a predetermined threshold.

7. A method according to claim 3, comprising further steps of detecting end of the user data transmission on said additional signalling channel, transmitting from said base station to said one of said plurality of mobile radio stations on said additional signalling channel a command to go back to said control channel.

8. A method according to claim 3, comprising further steps of detecting end of the user data transmission on said additional signalling channel, allowing said one of said plurality of mobile stations to stay on said additional signalling channel for a limited period of time in order to wait for a new user data transmission.

9. A data transmission method in a radio system, comprising steps of providing a first radio channel dedicated to and operating only as a control channel for signalling control messages between a base station and a plurality of mobile stations and for transmitting user data messages, providing a second radio channel dedicated to and operating only as an additional signalling channel for transmitting user data messages and control messages and operating according to the same protocol as said first radio channel, providing said control messages transmitted on said control channel with a first system code indicating to said plurality of mobile stations that said first radio channel is a control channel, providing said control messages transmitted on said additional signalling channel with a second system code indicating to said plurality of mobile stations that said second radio channel is not a control channel, transmitting a user data transmission request from said base station to one of said plurality of mobile radio stations on said control channel, transmitting a user data transmission acknowledgement message from said one of said plurality of mobile radio stations to said base station on said control channel, transmitting from said base station to said one of said plurality of mobile radio stations on said control channel a command to go to said additional signalling channel, carrying out a user data transmission on said additional signalling channel, while transmitting control messaging on said control channel.

10. A method according to claim 9, comprising a further step of allowing two or more of said mobile radio stations to simultaneously communicate on said additional signalling channel.

11. A method according to claim 9, comprising a further step of controlling the number of said mobile radio stations which communicate simultaneously on said additional signalling channel in such a way that an effective transmission rate per a mobile radio station on said additional signalling channel is equal to or higher than a predetermined threshold.

12. A method according to claim 9, comprising further steps of detecting end of the user data transmission on said additional signalling channel, transmitting from said base station to said one of said plurality of mobile radio stations on said additional signalling channel a command to go back to said control channel.

13. A method according to claim 9, comprising further steps of detecting end of the user data transmission on said additional signalling channel, allowing said one of said plurality of mobile stations to stay on said additional signalling channel for a limited period of time in order to wait for a new user data transmission.

* * * * *

UNITED STATES PATENT AND TRADEMARK OFFICE
CERTIFICATE OF CORRECTION

PATENT NO. : 5,799,251
DATED : Aug.25, 1998
INVENTOR(S) : PAAVONEN

It is certified that error appears in the above-indentified patent and that said Letters Patent is hereby corrected as shown below:

On the title page, please change:
"[63] Continuation-in-part of Ser. No. 211,900, filed as PCT/FI93/00324, Aug. 17,1993, published as WO94/05125, March 3, 1994, abandoned."
to
--[63] Continuation of Ser. No. 211,900, filed as PCT/FI93/00324, Aug.17,1993, published as WO94/05125, March 3, 1994, abandoned.--

Signed and Sealed this

Tenth Day of April, 2001

Attest:

NICHOLAS P. GODICI

Attesting Officer    Acting Director of the United States Patent and Trademark Office